(12) United States Patent
Wilbrink et al.

(10) Patent No.: US 9,208,452 B2
(45) Date of Patent: Dec. 8, 2015

(54) DIGITAL RIGHTS MANAGEMENT FOR PUBLISHING SCANNED DOCUMENTS ON THE INTERNET

(75) Inventors: Tijs I. Wilbrink, En Leiden (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 11/306,671

(22) Filed: Jan. 6, 2006

(65) Prior Publication Data

US 2007/0265854 A1    Nov. 15, 2007

(51) Int. Cl.
*G06F 21/00* (2013.01)
*G06Q 10/00* (2012.01)
*G06Q 30/00* (2012.01)

(52) U.S. Cl.
CPC .............. *G06Q 10/00* (2013.01); *G06Q 30/00* (2013.01)

(58) Field of Classification Search
CPC ..................................................... G06F 21/00
USPC ..................................................... 705/50–79
See application file for complete search history.

(56) References Cited

U.S. PATENT DOCUMENTS

| | | | |
|---|---|---|---|
| 5,530,520 A * | 6/1996 | Clearwater | 399/366 |
| 6,327,600 B1 * | 12/2001 | Satoh et al. | 715/207 |
| 6,721,793 B1 | 4/2004 | Corless | |
| 6,728,773 B1 | 4/2004 | Corless | |
| 2001/0008557 A1 * | 7/2001 | Stefik et al. | 380/202 |
| 2001/0044781 A1 | 11/2001 | Shutes | |
| 2003/0046093 A1 * | 3/2003 | Erickson et al. | 705/1 |
| 2004/0010486 A1 | 1/2004 | MacQueen et al. | |
| 2004/0073514 A1 * | 4/2004 | Stefik et al. | 705/52 |
| 2004/0148191 A1 | 7/2004 | Hoke, Jr. | |
| 2005/0004873 A1 | 1/2005 | Pou et al. | |
| 2005/0060542 A1 | 3/2005 | Risan et al. | |

FOREIGN PATENT DOCUMENTS

| | | | | |
|---|---|---|---|---|
| EP | 1 187 476 A1 | | 3/2002 | |
| JP | 05046446 A | * | 2/1993 | .............. G06F 12/00 |
| WO | PCT/US00/01701 | | 1/2000 | |
| WO | PCT/US2004/002356 | | 1/2004 | |

* cited by examiner

*Primary Examiner* — James A Reagan
(74) *Attorney, Agent, or Firm* — Whitham Curtis Christofferson & Cook, PC; Ronald A. Kaschak

(57) ABSTRACT

While documents which may be subject to existing copyrights are scanned to form electronically transmissible files, information is extracted from the copyright notice, supplemented by manual or automated research and processed by performing calculations of critical dates for geographical areas of interest preferably provided from memory as a table of algorithms to determine if the document is in the public domain or if a license for electronic distribution can be obtained. Automated generation and/or transmission of license requests is also provided. Deletion of electronic files from local storage for particular areas and identifiers thereof form indices for particular areas are also provided if a license for electronic distribution of particular documents is not obtained.

21 Claims, 4 Drawing Sheets

Title      Copyright date [/range]: 2002      Author

*Who Says Elephants Can't Dance?* © 2002 by Louis V. Gerstner, Jr. All rights reserved. Printed in the United States of America. No part of this book may be used or reproduced in any manner whatsoever without written permission except in the case of brief quotations embodied in critical articles and reviews. For information address HarperCollins Publishers Inc., 10 East 53rd Street, New York, NY 10022.

Publisher details

HarperCollins books may be purchased for educational, business, or sales promotional use. For information, please write to: Special Markets Departments, HarperCollins Publishers Inc., 10 East 53rd Street, New York, NY 10022.

Designed by William Ruoto

Library of Congress Cataloging-in-Publication Data
Gerstner, Louis V.
   Who says elephants can't dance? : inside IBM's historic turnaround / Louis V. Gerstner, Jr
   p. cm.
   International Business Machines Corporation--Management. 2. International
Business Machines Corporation-- History. 3. Computer industry--United States
      4. Electronic office machines industry United States--History.
5. Corporate turnarounds--United State Case Studies. 1. Title.
HD9696.2.U6412545 2002
004 '068--dc21                                                                                                2002027523

ISBN 0-06-052379-4 (alk.paper) — ISBN Reference 10  9  8  7  6  5  4  3  2  1

*Figure 6*

| Geographic Area | Type of Material | Critical Dates & applicable set of rules | Critical Dates (continued) & applicable set of rules | ... |
|---|---|---|---|---|
| Taiwan | Books | Year 0-75 | Year 75 - open | |
| | | Ownership with author | Free usage | |
| | Article | NA | NA | ... |
| Netherlands | ... | | | |
| United States | | | | |

*Figure 7*

DIGITAL RIGHTS MANAGEMENT FOR PUBLISHING SCANNED DOCUMENTS ON THE INTERNET

BACKGROUND OF THE INVENTION

1. Field of the Invention

The present invention generally relates to electronic publishing and, more particularly, to management of rights to materials which may be subject to copyright that may be provided over the Internet or other electronic media.

2. Description of the Prior Art

The so-called "information age" has been characterized by the increased ease of access to information over networks such as the internet and numerous businesses have developed offering the service of providing access to various types of materials through their search portals. Recently, such information has included recorded music and material which has been electronically published and, even more recently, it has been proposed to provide books which have been optically scanned to obtain an electronic file suitable for such transmission. Of course, any of these materials may be subject to copyright rights and numerous arrangements have been proposed to collect royalties for the information so provided which is subject to copyright rights, generally applying a charge for each item provided.

However, copyright rights are generally of limited duration, after which the material passes into the public domain and may be freely copied. Thus, while it may be assumed that copyright rights apply to recently created works such as recorded music and information which has been electronically published, information which was originally published in hard copy form and is optically scanned to obtain an electronic file for transmission may be of any age and possibly in the public domain. If the document is in the public domain it is desirable to avoid charges which might be considered to be improperly collected royalties while it in also necessary to observe any copyright rights which may exist.

This problem of discriminating materials which may be in the public domain and materials which may be under copyright can be quite complex and varies from country to country. Much of the complexity derives from the fact that the duration of copyrights has been extended from time to time and renewals of copyright registrations may be permitted or may have been permitted at some time in the past. While it is currently possible to optically scan materials such as printed books with relatively high throughput, the time required to determine whether particular materials are in the public domain or subject to copyright rights may present significant delays in providing the materials by electronic means such as the Internet.

SUMMARY OF THE INVENTION

It is therefore an object of the present invention to provide a system for rapidly discriminating whether or not copyright rights exist for particular printed materials from data acquired by optical scanning.

It is a further object of the invention to provide a system for management of copyright rights for printed materials which are to be distributed electronically.

In order to accomplish these and other objects of the invention, a digital rights management method and apparatus for providing a computer program are provided for performing steps of optically scanning a document to generate an electronically transmissible file, extracting selected information from a page of the document, computing critical dates for expiration of rights from the selected information, and selectively granting access to the electronically transmissible file based on results of the computing step.

BRIEF DESCRIPTION OF THE DRAWINGS

The foregoing and other objects, aspects and advantages will be better understood from the following detailed description of a preferred embodiment of the invention with reference to the drawings, in which:

FIG. 6 illustrates obtaining required information for operation of the invention by scanning of a published book, and FIG. 7 illustrates an exemplary table for determining copyright duration in respective countries.

DETAILED DESCRIPTION OF A PREFERRED EMBODIMENT OF THE INVENTION

Figure 1:
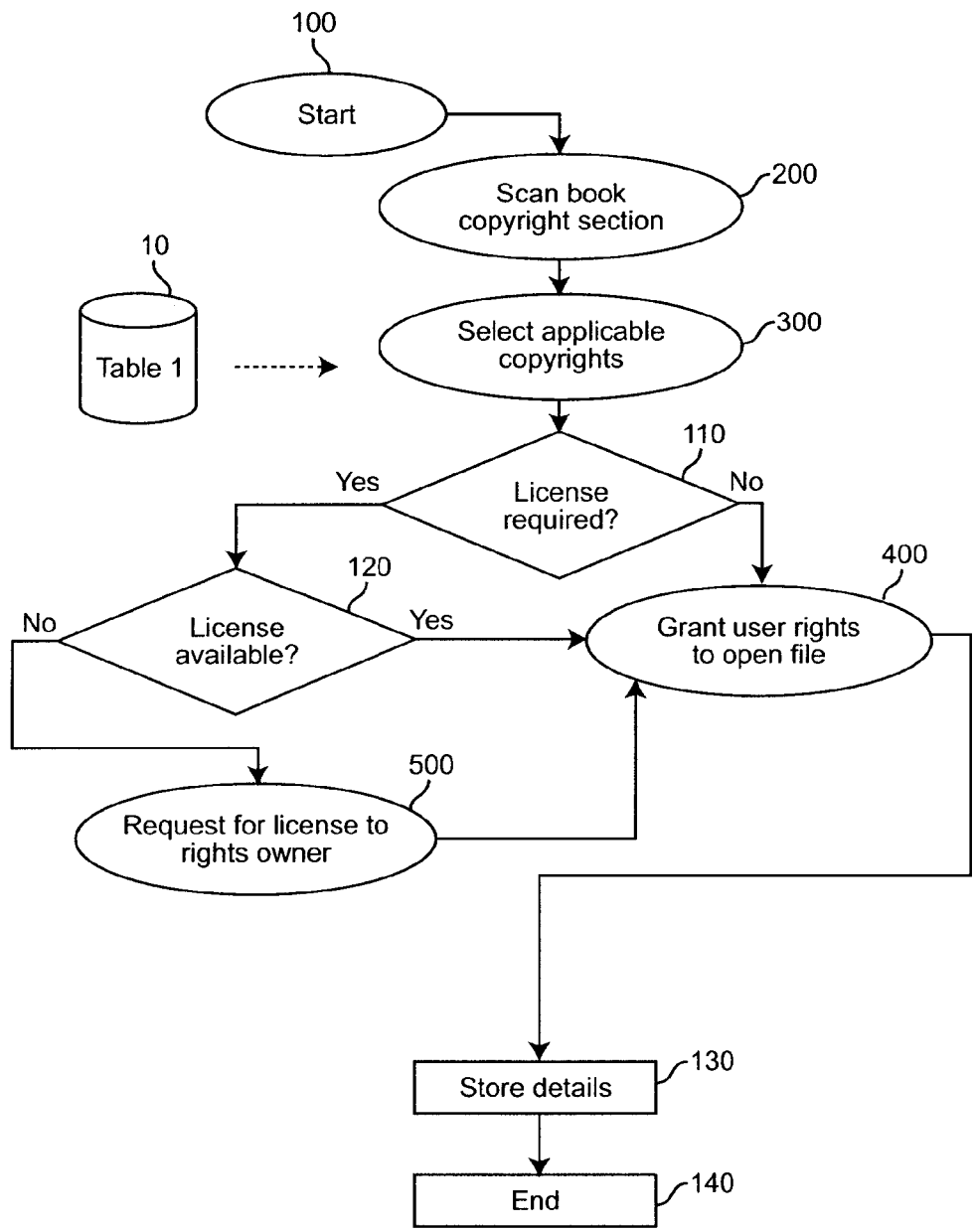
FIG. 1 is a high level flow diagram illustrating operation of the overall digital rights management system in accordance with the invention.

Referring now to the drawings, and more particularly to FIG. 1, there is shown a high level flow diagram of the digital rights management (DRM) system in accordance with the invention. It is preferred that the invention be implemented in software run on a general purpose data processor which is also used with other software for optical character recognition or compression in order to reduce required storage space for the many published documents which are contemplated as being placed in electronic form, particularly since captured optical images of at least one page of each document is used as an input to the digital rights management system of the present invention. However, it is to be understood that the invention can also be implemented with special purpose hardware and need not be integrated with other devices for capturing images of pages and/or providing a digital and electronically transmissible electronic file corresponding to the document as will be apparent to those skilled in the art in view of the following description of the invention. As will be readily understood by those skilled in the art, the flow diagrams of FIGS. 1-5 can also be understood as a block diagram of the apparatus elements (e.g. the scanning step 200 being understood as an optical scanner and so forth) preferred for practice of the invention whether those elements in accordance with the invention are provided in discrete hardware or a general purpose processor is configured as such by software.

The operation of the invention begins (100) when scanning of a book or other document is begun. (It should be recognized that copyright protection covers many types of subject matter other than books such as magazines, photographs, manuscripts and the like. The term "document" is thus used hereinafter specifically for the purpose of providing a collective reference to all materials in a fixed form for which copyright protection is provided in any given country and any reference to any particular type of such documents should be also understood as being a similarly collective reference to other types of materials as may be indicated by the context of such usage.) Generally, copyright information is printed on the back of the title page of a book but can be elsewhere, particularly for other types of documents. However, the inclusion of copyright information in the document is required and it is assumed for purposes of this description of the invention that copyright information will therefore be scanned, as indicated at 200, at some point during the scanning of the document.

Figure 2:
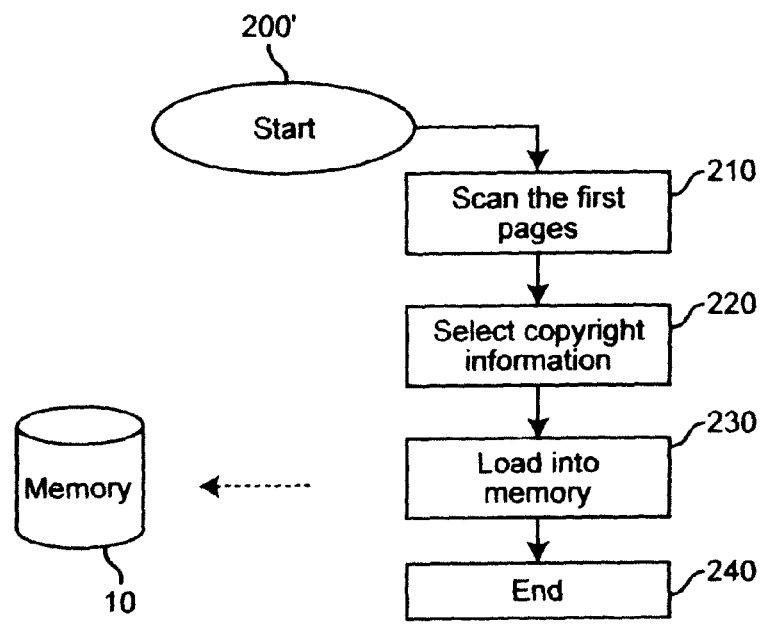
FIGS. 2, 3, 4 and 5 are detail flow diagrams for respective portions of the flow diagram of FIG. 1.
Figure 3:
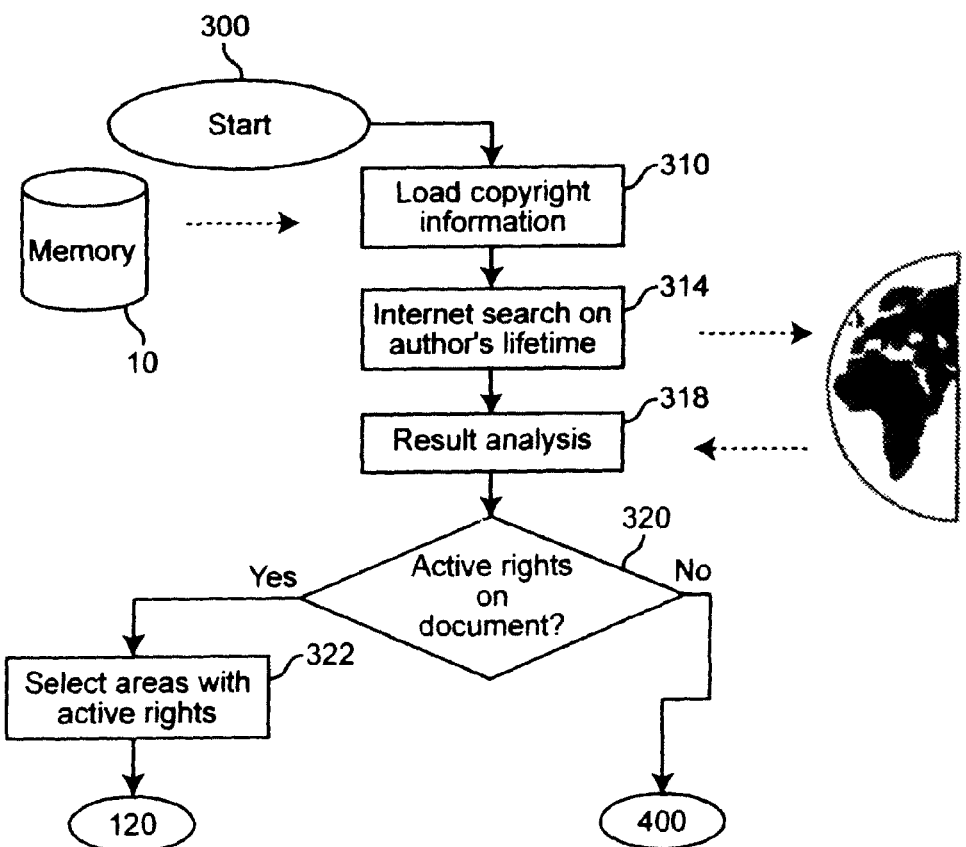

Details of this scanning operation 200 are shown in FIG. 2. It should be appreciated that scanning operation 200 is a composite operation since particular data must be recognized and extracted for practice of the invention. In general, some processing of the raw data derived from the output of an optical detector will be performed, if only to reduce the volume of data which must be stored or further processed. Such processing to reduce data volume can take numerous forms such as optical character recognition or image compression in accordance with some accepted standard such as that of the Joint Photographic Experts Group (JPEG). The type of processing applied to portions of the document other than copyright information is unimportant to the practice of the invention. However, information relevant to copyrights must be subjected to optical character recognition of some type (also not critical to the successful practice of the invention) in order to obtain data upon which the invention can operate. Fortunately, the copyright notice must be of one of several recognized forms (e.g. the symbol "©" or the word "copyright" with a date and a name) which allows the location of the information to be quickly and easily determined. Other information upon which the invention operates will generally be in close proximity thereto as will be discussed below in connection with FIG. 6.

The scanning process 200 starts (200') with the onset of scanning of the document such as the first few pages of a book, as indicated at 210. The copyright information is located and selected as illustrated at 220 which also includes the performance of optical character recognition of some type such as template matching which may allow some acceleration of the processing to recognize words which are often encountered such as "copyright" (word or symbol) or the name of a publisher which may be found in numerous books which may be processed by the invention. As illustrated in FIG. 6, the copyright notice can be located easily because of its form while the title of the document will generally immediately precede the copyright word or symbol and the year of publication must follow the "copyright" word or symbol followed by the name of the author. Similarly, the international standard book number (ISBN) is similarly of a recognizable format and can be located on that basis with similar ease. Other information relevant to the copyright rights which are asserted can generally be readily found as well by parsing the language for terms such as "except" or "purposes" and words syntactically associated therewith which are largely standardized in such notices. This information thus captured is then stored as illustrated at 230 and the process exits 240. It should be appreciated that, in the case of a book or magazine or the like, the composite scanning process can be completed while scanning of only the first few pages of the document and, if the document is determined to be in the public domain in accordance with the invention, most of the remainder of the processing of the invention as illustrated in FIG. 1 and detailed in FIGS. 3-5 can be completed before scanning of the remainder of the pages is completed; allowing a distributable file to be provided within the time required for the scanning operation itself.

Returning to FIG. 1, selection of the appropriate copyright duration rules are selected and retrieved from memory 10, as illustrated at 300. This process is also a composite process as detailed in FIG. 3 and memory 10 is preferably organized in the form of a table illustrated in FIG. 7. Process 300 starts (300') upon the loading of the copyright information from the document into the system. Then, as illustrated at 310, the copyright expiration information is loaded from memory 10 which may be a publicly accessible database or local or remote storage. This data is preferably in the form of a table such as is shown in FIG. 7 in which a line is provided for each country and which may be subdivided for different types of documents to which different expiration rules apply in that particular country as is illustrated for books and articles in Taiwan. The columns of the table are preferably arranged for particular rules for determination of particular critical dates (sometimes referred to hereinafter, for brevity, as critical date rules) when the document may have passed or will pass into the public domain (e.g. a date when a renewal was due but may or may not have been made, a number of years from publication for an anonymous work, a number of years from the date of death of a named author and the like) based on information such as biographical data concerning the author (e.g. whether or not the author is living, the date of death of a deceased author or whether or not a renewal was made when due) which may often be automatically or manually researched in publicly accessible databases over a network such as the Internet as illustrated at 314.

Arranging data in a table, possibly as algorithms for computation of particular critical dates from the copyright information scanned from the document and supplemented by research as alluded to above, allows relatively simple computations to be made to determine specific critical dates which may each be tested against the current date to determine if expiration of the copyright has occurred under any of the rules for each country of interest. While it is contemplated that most, if not all, countries of the world will be of interest (depending on the geographical coverage of the service providing the documents, it should be noted that many of the computations for a given country may be conditionally excluded logically which a tabular form of critical date algorithms facilitates. For example, a computation based on the date of death of an author would be excluded if the author was living or the work was anonymous. In practice, only a very few computations are required for any given country and can be carried out very rapidly since they generally involve only a single addition or subtraction and a comparison. The results of this analysis 318 may then be logically combined to determine if there are current, active copyright rights and in which countries or regions (e.g. the European Union) they may exist. As illustrated at 320, if there are active rights, the countries or regions, hereinafter collectively referred to as "areas", in which the active rights exist are selected and the process resumes at 120 of FIG. 1. If no active rights exist, the process resumes at 400 of FIG. 1 in which rights to open the file produced by scanning the document are granted.

If active rights exist, it is then determined if a license is required for the particular use contemplated or which is permitted through the information provider using the invention. If not, the process branches to step 400 which will be described below. If a license is required, the availability of a generic or specific license as may be determined from the scanned data is determined as illustrated at 120. That is, the copyright notice may provide information indicating that the copyright duration has elapsed in most but not all areas, such as fifty years after the death of the author which can be determined from information in the copyright notice as supplemented by research as alluded to above. Other information contained in the copyright notice may, for example, waive royalties, indicate particular permitted uses, be a so-called "fair use" under the applicable statutes, or be owned by an organization such as a university affiliated with a royalty collecting agency which makes licenses generally available if a specified royalty is paid. If so, the operation branches to 400.

Figure 5:
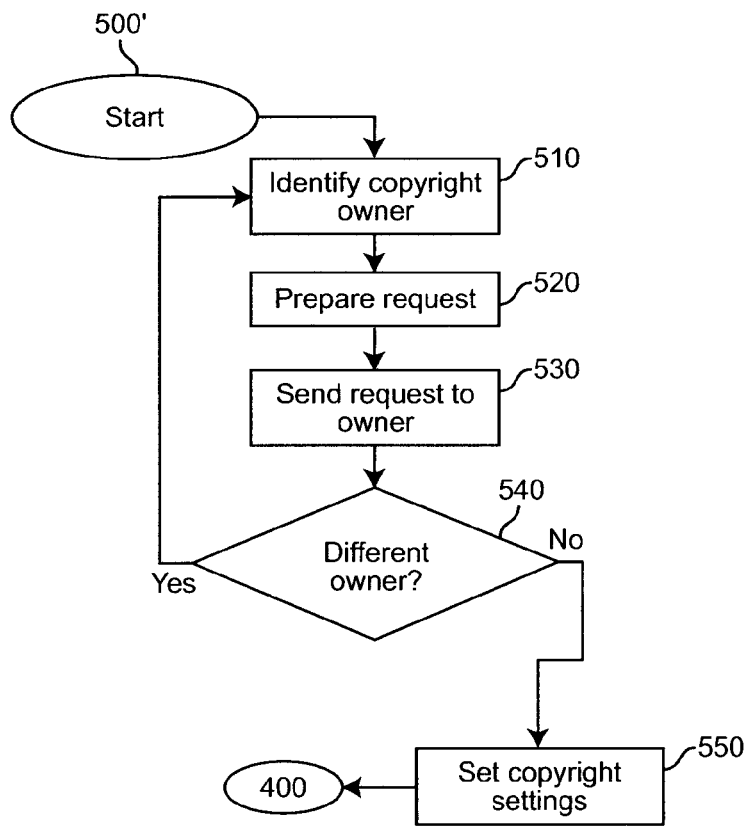

If not, the DRM of the invention either notifies the user that a license is required and provides information with which to request such a license or, as a perfecting feature of the invention, a license request can be automatically generated, as illustrated at 500, as will be discussed below in connection with FIG. 5. Whether or not the license is granted the operation of the DRM continues with step 400. Thus it is seen that the operation of the DRM can branch along several distinct paths depending on the nature of the active rights and the availability of a license as may be found and that all three of these branches converge again at step 400.

Figure 4:
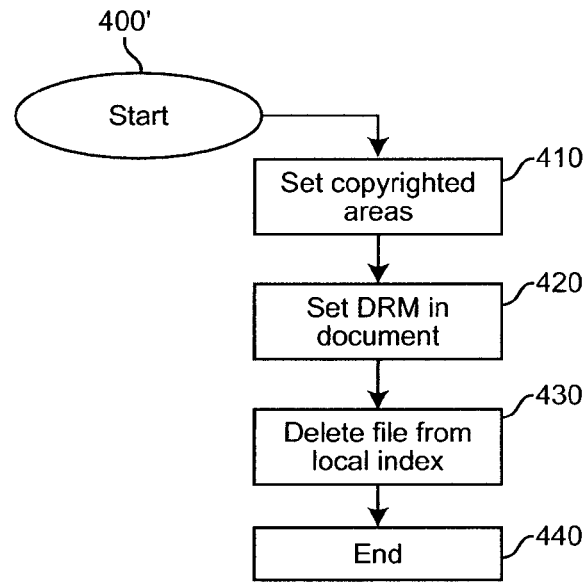

Step 400 is also a composite step which is detailed in FIG. 4 and is started (400') upon completion of the appropriate branch of the process as described above. First, the areas in which the copyrighted materials are not allowed to be used, as determined at steps 320, 322 are set as indicated at 410 and the DRM is then set within the document, itself, to control access within the restricted areas. Then, as further protection for preventing access to copyrighted materials, the material or an identifier thereof is deleted from indices accessible from the restricted areas and deleted from sites local thereto, as illustrated at 430. Access to the documents is otherwise granted to users and the process ends (440).

Following the process of granting user access rights to the electronic file developed by scanning the document, it is considered desirable to archive the results of the processing performed as described above in order to document the fact that the process was, in fact, carried out for the document and store the details of the information on which the determination that user rights could be granted was made, as illustrated at 130. If it is determined that user rights could not be granted and the file deleted, it is also desirable that a record be made and stored to avoid duplication of processing for the same document at a later date or for other purposes such as generating a message to a user that the document is unavailable through the system due to copyright rights. The process then ends at 140.

As alluded to above, it is considered to be desirable that a request for a license be automatically generated since it is anticipated that the generation of electronic files of documents and corresponding determination of the ability to make the files available electronically while observing copyright rights will be performed at relatively high volume. A suitable process for doing so is detailed in FIG. 5 as will now be discussed. It should be appreciated that this process may be considered as a perfecting feature of the invention or may be used in a substantially stand-alone manner as an intermediary to grant "instant licenses" to materials under copyright.

The process of automatically generating a license request begins (500') upon exhaustion of other possibilities for obtaining a license, as described above. The copyright owner is then determined, as illustrated at 510, generally from the copyright notice itself or using the ISBN number read in operation 200, described above, to research the copyright owner through an ordering database such as is used in bookstores or through a national copyright office. The request can then be prepared, as illustrated at 520, using conventional word processing techniques by appending copyright owner information to a form letter. The form letter should preferably include questions about the areas and the potential derivative works to be used. The request is then sent (530) to the copyright owner, preferably through e-mail but facsimile or physical mail may be preferable in some instances. Once received, the copyright owner may select a different person or organization such as an assignee of the copyright to handle the request, as illustrated at 540. This may be done directly through a web service or other online service or indirectly by providing the information in a reply to the requestor. In either case, the processing is essentially a loop back to step 510 to generate another request for a license. Once a reply to the request for a license is received from a person or organization having authority to grant or withhold a license, the copyright settings for the document are set and the process exits, preferably to step 400, described above, for completion of the processing in accordance with the invention.

In view of the foregoing, it is clearly seen that the invention can automatically and autonomously manage copyright rights in connection with developing electronically transmissible files derived from optical scanning of documents and to document the determination that particular documents can be distributed electronically or to procure a license to do so.

While the invention has been described in terms of a single preferred embodiment, those skilled in the art will recognize that the invention can be practiced with modification within the spirit and scope of the appended claims.

What is claimed is:

1. A digital rights management method including steps of
optically scanning a document of any age, said document containing copyright information in a specified form, and for which copyright rights may or may not exist to generate an electronically transmissible file,
extracting selected information including said copyright information from said electronically transmissible file of a page of said document based on proximity to a word, name or symbol required by said specified form and applying a type of character recognition to said selected information to form scanned data,
retrieving information to determine copyright duration from computer accessible storage,
using a computer, computing critical dates for expiration of copyright rights from said scanned data extracted by said extracting step and information to determine copyright duration retrieved in said retrieving step,
testing said critical dates against a current date to determine if copyright rights in regard to said document can exist or are expired depending upon said scanned data extracted in said extracting step,
selectively allowing or denying Internet access to said electronically transmissible file depending upon results of said testing step indicating that copyright rights in said document can exist or are expired, respectively, and
deleting an identifier of said electronically transmissible file to which said Internet access was selectively denied from indices accessible from restricted areas and from sites local thereto.

2. The method as recited in claim 1 wherein said step of computing critical dates includes a step of
retrieving critical date rules from storage.

3. The method as recited in claim 2 wherein said critical date rules are stored in a table.

4. The method as recited in claim 3 wherein said table includes critical date rules arranged by area.

5. The method as recited in claim 2 wherein said critical date rules are in the form of algorithms for computing critical dates.

6. The method as recited in claim 1 including the further step of providing information for preparing a license request.

7. The method as recited in claim 1 including the further step of automatically preparing a license request.

8. The method as recited in claim 7 including the further step of communicating the license request to an owner of a copyright of a document.

9. The method as recited in claim 1, further comprising deleting said electronically transmissible file from a memory if said Internet access is not selectively granted.

10. Apparatus comprising a computer-readable medium or communication link to a computer readable medium providing an executable computer program, said program, when run on a computer, causing said computer to perform steps of
optically scanning a document of any age, said document containing copyright information in a specified form and for which copyright rights may or may not exist to generate an electronically transmissible file,
extracting selected information including copyright information from said electronically transmissible file of a page of said document based on proximity to a word, name or symbol required by said specified form and applying a type of character recognition to said selected information to form scanned data,
retrieving information to determine copyright duration from a computer accessible storage,
computing critical dates for expiration of copyright rights from said scanned data extracted by said extracting step to determine copyright duration and information retrieved in said retrieving step,
testing said critical dates against a current date to determine if copyright rights in regard to said document can exist or are expired depending upon said scanned data extracted in said extracting step,
selectively allowing or denying Internet access to said electronically transmissible file depending upon results of said testing step indicating that copyright rights in said document can exist or are expired, respectively, and
deleting an identifier of said electronically transmissible file to which said Internet access was selectively denied from indices accessible from restricted areas and from sites local thereto.

11. The apparatus as recited in claim 10 wherein said step of computing critical dates includes a step of
retrieving critical date rules from storage.

12. The apparatus as recited in claim 11 wherein said critical date rules are stored in a table.

13. The apparatus as recited in claim 12 wherein said table includes critical date rules arranged by area.

14. The apparatus as recited in claim 11 wherein said critical date rules are in the form of algorithms for computing critical dates.

15. The apparatus as recited in claim 10 including the further step of providing information for preparing a license request.

16. The apparatus as recited in claim 10 including the further step of automatically preparing a license request.

17. The apparatus as recited in claim 16 including the further step of communicating the license request to an owner of a copyright of a document.

18. The apparatus as recited in claim 10, wherein said computer is further configured for
deleting said electronically transmissible file from a memory if said Internet access is not selectively granted.

19. A method of managing copyright rights for electronic publishing of optically scanned documents of any age and for which copyright rights may or may not exist, said method comprising steps of
configuring a digital computer to control optical scanning of a document containing copyright information in a specified form to generate an electronically transmissible file,
configuring said digital computer to recognize and extract selected information including said copyright information from said electronically transmissible file of a page of said document based on proximity to a word, name or symbol required by said specified form to form scanned data,
configuring said digital computer to retrieve information to determine copyright duration from a computer accessible storage,
configuring said digital computer to compute critical dates for expiration of copyright rights from said scanned data and information retrieved from said computer accessible storage,
configuring said digital computer to test said critical dates against a current date to determine if copyright rights in regard to said document can exist or are expired depending upon said scanned data extracted in said extracting step,
configuring said digital computer to selectively allow or deny Internet access to said electronically transmissible file responsive to said results of said testing step indicating that copyright rights in said document can exist or are expired, respectively, and
configuring said digital computer to delete an identifier of said electronically transmissible file to which said Internet access was selectively denied from indices accessible from restricted areas and from sites local thereto.

20. The method as recited in claim 19 further comprising a step of
configuring said digital computer to automatically prepare a request for a license responsive to results of said testing step indicating that copyright rights in said document can exist.

21. The method as recited in claim 20 further including a step of
configuring said digital computer to delete said electronically transmissible file if a requested license is not granted.

* * * * *